Aug. 22, 1967 T. G. STEHNEY 3,337,783
SHORTED EMITTER CONTROLLED RECTIFIER WITH IMPROVED TURN-OFF GAIN
Filed Jan. 16, 1964 2 Sheets-Sheet 1

WITNESSES
Theodore F. Wrobel
James F. Young

INVENTOR
Thomas G. Stehney
BY
Gordon H. Telfer
ATTORNEY 3,337,783

SHORTED EMITTER CONTROLLED RECTIFIER WITH IMPROVED TURN-OFF GAIN

Thomas G. Stehney, Rillton, Pa., assignor to Westinghouse Electric Corporation, Pittsburgh, Pa., a corporation of Pennsylvania Filed Jan. 16, 1964, Ser. No. 338,127
4 Claims. (Cl. 317—235)

This invention relates generally to semiconductor devices and, more particularly, to semiconductor devices of the four region, three terminal type frequently known in the art as controlled rectifiers.

Present controlled rectifier designs are successful in switching from a high impedance state to a state of very low impedance upon application of a control signal of moderate magnitude to the control terminal of the device. However, it has generally been the case that switching from the low impedance state to the high impedance state could not be effected by applying a signal to the control terminal that was of a reasonable magnitude. Hence, prior applications generally provided for the decoupling of the controlled rectifier from the main circuit in order to turn it off.

Some existing devices are directed to a solution of the turn-off problem by device designs that provide a relatively high turn-off gain. By the expression "turn-off gain" is meant the ratio of the magnitude of current being conducted through the device in the on state to the magnitude of control current necessary to effect turn-off. It has been recognized that achievement of a good turn-off gain depends on decreasing the effective alpha, or current amplification factor, of each of the two-three region transistor equivalents of which a controlled rectifier is comprised. In the past, however, it has generally been the case that in designing a device for low alpha and good turn-off gain, the turn-on gain, meaning the ratio of the magnitude of current to be carried by a device relative to the magnitude of control current necessary to turn it on, is necessarily reduced. It has also been the case that in devices designed to achieve good turn-off characteristics, the turn-off performance of the device had a tendency to cause current concentration at a point or a small area and consequently made thermal destruction of the device a great danger.

It is, therefore, an object of the present invention to provide an improved semiconductor device of the controlled rectifier type having high turn-off gain.

Another object is to provide an improved semiconductor controlled rectifier having good turn-off characteristics without substantial deterioration of the turn-on characteristics compared with prior designs.

Another object is to provide an improved semiconductor controlled rectifier capable of handling relatively high currents and voltage in both turn-on and turn-off modes of operation while minimizing the danger of thermal destruction.

Another object of the present invention is to provide an improved semiconductor controlled rectifier whose switching characteristic is less sensitive to temperature changes than for prior controlled rectifiers.

The above and other objects of the present invention are achieved by the provision of a semiconductor controlled rectifier having an emitter region disposed on an adjacent base region of opposite semiconductictivity type. A control contact, also referred to as the gate contact, is also disposed on the same surface of the base region. In a departure from prior art designs, a portion of the junction between the emitter and base regions is shorted so as to reduce the injection efficiency of the emitter and permit good turn-off gain. The position of the shorted portion of the junction is such that it is remote from the gate contact so that interaction between the gate contact and the emitter occurs as in conventional controlled rectifiers and permits good turn-on characteristics.

In preferred designs in accordance with the present invention, the above referred to emitter is an annular region which is shorted on its inner periphery to the base region and the gate contact has an annular configuration surrounding that of the emitter. Alternatively, the gate contact may have a circular configuration with the annular emitter disposed therearound that is shorted to the base on its outer periphery. These geometrical configurations provide a symmetry that prevents current concentration at a point during turn-off, since current concentration is uniform in a ring pattern defined by the emitter and hence the danger of thermal destruction of the device, even when handling high currents, is substantially reduced.

In accordance with other features of the invention, the thicknesses of both the first base region and the second base region, that is, the two inner regions of the device, are made relatively great so as to further improve the turn-off gain of the device. More particularly, it has been found desirable that the thickness of each of the base regions of the device be greater than a carrier diffusion length.

In accordance with another feature of the present invention, the emitter in the control portion of the device is made relatively thin in its cross-section so that it is less than about four carrier diffusion lengths wide.

Devices in accordance with the present invention, both as to their structure and their manner of operation, will be better understood with reference to the following description taken in connection with the accompanying drawing wherein.

Figures 1, 3:
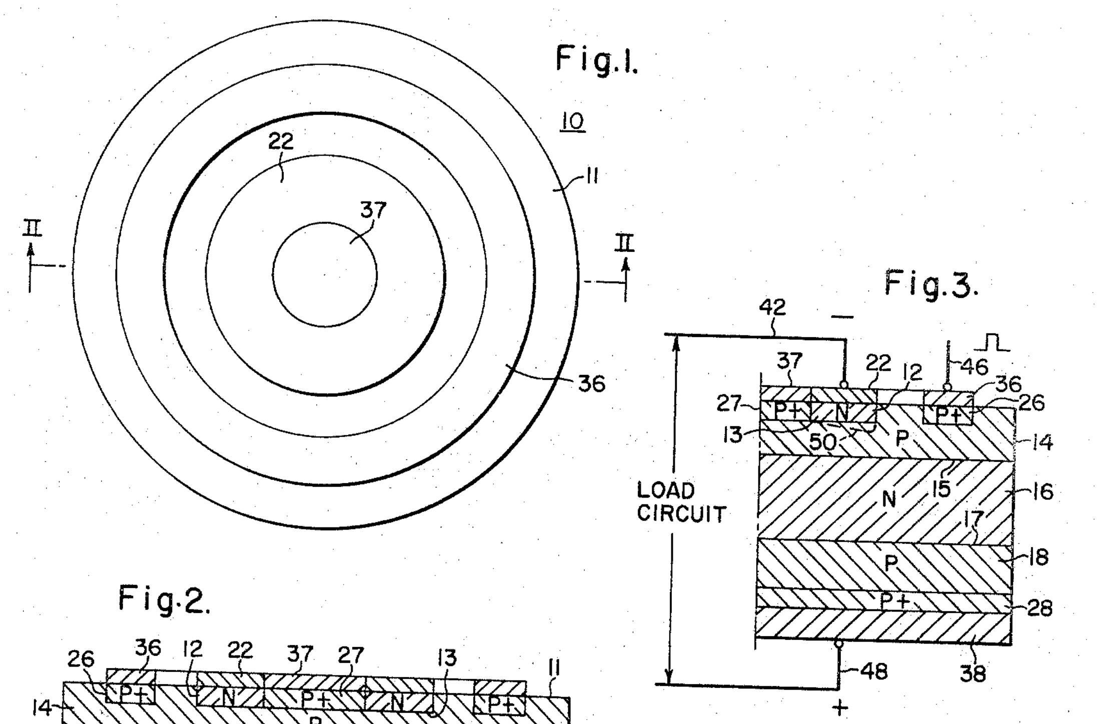
FIGURE 1 is a plan view of a semiconductor device in accordance with the present invention.
FIGS. 3 and 4 are partial cross-sectional views of the device of FIGS. 1 and 2 with a schematic indication of circuit connections to illustrate the operation of the present invention.
Figure 2:
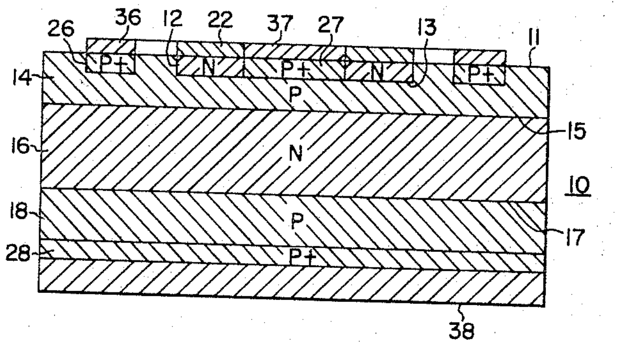
FIG. 2 is a cross-sectional view of the device of FIG. 1 taken along the line II—II.

Referring to FIGS. 1 and 2, there is shown a semiconductive body 10 comprising four successive regions 12, 14, 16 and 18 of alternate semiconductivity type providing an NPNP structure. Between contiguous regions, PN junctions 13, 15 and 17 are formed. The four successive regions will be sometimes referred to hereinafter as the first emitter region 12, the first base region 14, the second base region 16 and the second emitter region 18.

Since it is necessary to make electrical contact to one of the base regions, the first emitter region 12 occupies only a portion of the surface 11 of the first base region 14. On the remaining portion of the surface 11, a means to make electrical contact to the base 14 is provided in the form of an alloyed ohmic contact forming a recrystallized P+ region 26 and a metallic member 36 fused thereto. Means to make electrical contact to the second emitter region 18 is also provided in the form of an alloyed ohmic contact forming a recrystallized P+ region 28 and a metal member 38 fused thereto. Additionally, the emitter 12, which in this configuration is in the shape of an annular disc, is shorted on its inner periphery to the first base region 14 by an alloyed contact forming a recrystallized P+ region 27 and a mass of metal 37 fused thereto. The P-type regions 26, 27 and 28 are designated as P+ because of their relatively higher impurity concentration compared with that of the adjacent P-type region 14 or 18.

In the embodiment shown, the emitter region 12 is formed by the fusion of an alloy foil member having appropriate impurities therein to the semiconductor structure so that as a result of the fusion process the region 12 is formed of recrystallized semiconductive material with fused alloy contact 22 thereon.

While for clarity in the drawing, the metal members 22 and 37 are shown as distinct members, it is to be understood that as a consequence of the fusion process they flow together and make a direct short across the inner periphery of the PN junction 13 between the emitter 12 and the first base region 14 or the recrystallized portion 27.

Two significant features of the device of FIGS. 1 and 2 are that the emitter junction 13 is shorted over a portion of its periphery and the gate contact 36 is disposed in a position remote from the shorted portion of the junction 13.

Figure 4:
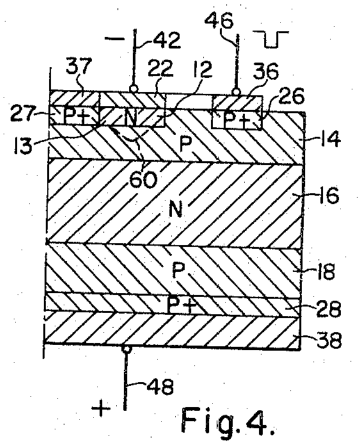

The significance of the device configuration of FIGS. 1 and 2 will now be described in connection with FIGS. 3 and 4 wherein half of the semiconductor device structure is shown as in FIG. 2. FIGS. 3 and 4 also illustrate conductive lead members 42, 46 and 48 affixed to metal contacts 22, 36 and 38, respectively. It is apparent that the lead member 42 will provide its intended function so long as it is connected to either the emitter metal member 22 or the short 37 or the fused material which these two metal members form. In the usual manner of operating a controlled rectifier, as illustrated in FIG. 3, the load circuit that is to be selectively energized or deenergized through the operation of the controlled rectifier is connected across the leads 42 and 48 that are in contact with the first and second emitters 12 and 18 of the device. The connection is made so that the polarity of the load circuit is such that the N-type emitter region 12, or cathode, is negative relative to the P-type emitter region 18, or anode, so that the PN junctions 13 and 17 are normally in a forward bias and thus each emitter injects minority carriers into the adjacent base region. The polarity of the load circuit also places the PN junction 15 between the first and second base regions 14 and 16 in a reverse bias so that the device is non-conductive and presents a high DC impedance to the load circuit. However, as in conventional controlled rectifier operation, the application of a positive pulse to the lead member 46 in contact with the gate contact 36 of the device, usually applied by a control circuit connected between the lead 42 to the cathode emitter and the lead 46 to the gate, will cause breakdown of the PN junction 15, usually by the avalanche mechanism, and permit high conduction through the device.

In FIG. 3, the profile of carriers injected by the emitter region 12 is illustrated by the dotted line 50. Because of the short across the junction 13 at the inner periphery of the emitter region 12, there is no carrier injection at the inner periphery of the emitter. The carrier injection increases as one moves radially outward through the emitter 12 and it is a maximum at the outer periphery. Consequently, the portion of the structure comprising the base regions 14 and 16 and the outer portion of the emitter 12 is equivalent to a transistor having relatively high alpha by reason of the relatively high carrier injection at the emitter outer periphery. Hence, since the requisite for the device to turn-on is that the sum of the alphas of the first three regions and the last three regions exceeds unity, the device turns on relatively easily. The short on the inner periphery of the emitter 12 does not substantially affect the turn-on characteristic relative to the turn-on characteristics of devices in accordance with the prior art wherein the structure is substantially the same without the emitter short.

After the controlled rectifier has been turned on, it will remain in the on state so long as the load circuit supplies a minimum current called the holding current. It is of course possible to turn off the device by reduction of the current in the load circuit either by opening the circuit or other means. However, it is often desirable that such modification of parameters in the load circuit not be necessary to turn off the device but rather that it be possible to turn off by the application of a reverse pulse to the control lead 46. While it is generally possible with prior controlled rectifiers to turn-off by application of a reverse pulse to the gate terminal, it is also the case that prior devices generally required a very large reverse gate pulse such as to make this form of operation impractical.

As FIG. 4 illustrates, the application of a reverse pulse to the control lead 46 modifies the minority carrier injection profile at the emitter junction 13 to that indicated by the dotted line 60. As described in connection with FIG. 3, the inner periphery of the emitter has negligible injection due to the short 37. Now with the application of a reverse pulse to the gate contact 36, the outer periphery of the emitter 12 also has a low injection since the reverse pulse to the gate tends to apply a reverse bias across the emitter junction or at least the outer peripheral portion thereof. Consequently, carrier injection from the emitter is concentrated at the central portion of the junction so that the effective emitter junction area is so restricted in size that it is insufficient to inject the required holding current for the device and the device will turn off.

It will be appreciated that devices in accordance with this invention may be fabricated in various sizes to permit control of either large or small currents in the load circuit with either large or small control signals applied to the gate lead 46. There will now be described as a specific example of the invention a device capable of controlling at least 10 amperes of current with at least 400 volts potential difference across the terminals 42 and 48 of the device with control signals of a magnitude of about 1 ampere and switching times of about 10 microseconds.

The device is fabricated by employing as the starting material a wafer of N-type silicon having a resistivity that is substantially uniform and about 20 ohm centimeters. The wafer is cut and lapped by conventional techniques to provide the dimensions of about 9 mils thickness and a major surface diameter of about 450 mils. A P-type impurity, such as gallium, is diffused into the starting material to produce a P-type surface layer of about 2 mils thickness with a surface concentration of about $10^{18}$ atoms per cubic centimeter. As a consequence of the diffusion operation, the impurity concentration in the diffused layer diminishes in penetrating within the starting material. The diffusion may be carried out in an inert gas or a vacuum at a temperature from about 1200° C. to about 1300° C. The diffusion may be performed in accordance with known techniques including that described in copending application Ser. No. 249,496, filed Jan. 4, 1963, by A. N. Knopp and assigned to the assignee of the present invention. The latter application describes a technique for the diffusion of aluminum and gallium into N-type silicon to provide a PN junction having a shallow impurity gradient with high surface concentration so as to permit high breakover voltages for the device.

Alloy foil members are disposed on the diffused wafer including a member capable of imparting N-type semiconductivity when fused to the P-type surface layer so as to provide the emitter 12 of the device. The remaining alloy foil members are such as to make ohmic contact with the P-type surface layer such as for the gate contact 36, the emitter contact 28 and the short 37.

The metal member for the N-type emitter may be of gold including about 0.1% by weight antimony. The emitter foil member has an inner diameter of about 200 mils and an outer diameter of about 230 mils and is shaped as a continuous annular disc. The P-type foil members may be, for example, of gold including about 0.5% by weight boron. The metal member for the gate contact 36 has an inner diameter of about 240 mils and an outer diameter of about 300 mils. The shorting member 37 has a diameter of about 200 mils and the metal member 38 forming the contact to the other emitter 18 completely covers the bottom surface of the semiconductive wafer. Upon fusion of the device and alloy foil members at a temperature of about 700° C. for a time of about 10 minutes and cooling, the N-type gold alloy forms a regrown semiconductive region 12 with metal member 22 thereon while the P-type gold alloy forms recrystallized semiconductive regions 26, 27 and 28 with metal members 36, 37 and 38 thereon.

The edges of the device including all of the diffused material thereon are removed either chemically or mechanically such as by sand blasting.

Additional conductive members are joined to the metal members 22, 36, 37 and 38 in a conventional manner with subsequent attachment of leads and encapsulation of the device by conventional techniques.

It is apparent that other contact materials may be employed to fabricate the device shown. It is also apparent that other fabrication techniques may be employed. For example, the emitter region 12 could be formed by diffusion of an N-type impurity rather than by alloy fusion. It is further to be understood that devices in accordance with this invention may be made of materials other than silicon including germanium and III–V compounds. It is further to be understood that the semiconductivity type of the various regions may be reversed from that shown. In the instance in which a PNPN device is fabricated and the gate terminal device is to be connected to the inner N region, then the description supplied in connection with FIGS. 3 and 4 is applicable but with the polarity of the main circuit and the control signal reversed from that shown.

It has been found that devices in accordance with the present invention are advantageous even when applications requiring good turn-off characteristics are not of major importance. Specifically, structures in accordance with the present invention have been noted to be less temperature sensitive than prior devices which did not include a short across the emitter junction. That is, it has been noted that with prior art devices an increase in the ambient temperature sometimes occurred to such an extent that the forward blocking voltage or breakover voltage, reduced and switching occurred even without the application of a signal to the gate contact. It has been found that devices in accordance with this invention are capable of a forward blocking voltage of at least about 500 volts up to the temperature of about 150° C.

Figure 5:
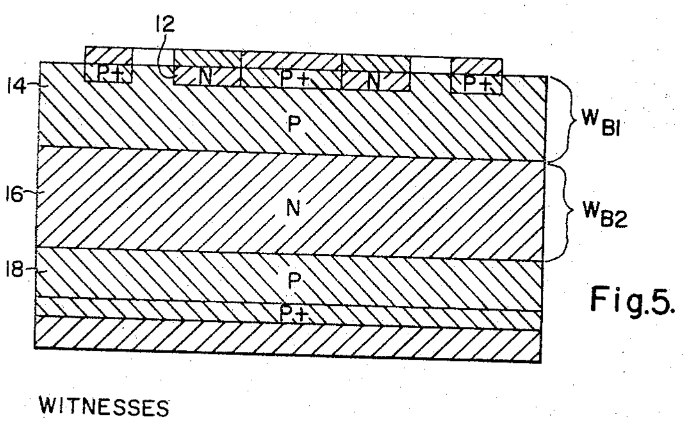
FIG. 5 is a cross-sectional view of a device in accordance with this invention to illustrate additional features of the invention.

FIG. 5 illustrates a further modification of the invention including the same structural elements as in FIG. 2 but with a variation in the thickness of regions 14 and 16, $W_{B1}$ and $W_{B2}$, respectively. The width of the base regions 14 and 16 has been purposely made relatively great so as to reduce the effective alphas of both portions of the device and further improve the turn-off characteristic. The width of each of the base regions 14 and 16 is greater than a carrier diffusion length. It has been found that such a wide base does not substantially increase the switching time of the device. If the base width is greater than two diffusion lengths, there is no excess minority carrier density to further increase the switching time. The forward voltage drop of the device increases somewhat but it can be controlled by controlling the impurity concentration in the base region. The width of the base region 14 can be similarly increased in addition for the reduction of the injection efficiency of the emitter 12 so as to further decrease the alpha.

As an example of a device in accordance with FIG. 5, the width of the base region 16 was about 12 mils while that of the base region 14 was about 8 mils. Such a device was capable of turn-off of 5 amperes at 300 volts and exhibited a forward voltage drop of 1.5 volts at 5 amperes. The foregoing characteristics were achieved with a device as described but without a shorting member 37 on the inner periphery of the emitter 12. Further improvement in turn-off gain may be achieved by also utilizing a shorted emitter as shown. It will be recognized that either one, or both, of the base regions 14 and 16 may have increased thickness in accordance with this invention.

In the embodiments of the present invention, the cathode emitter is a relatively narrow member having a width of less than about four diffusion lengths because this has been found to more readily permit the turn-off of the device. By the width of the emitter is meant the shortest lateral dimension such as between the inner and outer peripheries of the annular emitter 12. For maximum current handling capability, however, the length of the emitter (for example, the average of the inner and outer perimeters of the annular emitter 12) is made relatively large.

FIGS. 6, 7, 8 and 9 illustrate plan views of alternate embodiments of the present invention showing a variety of ways in which the emitter, gate and emitter short may be disposed in keeping with the present invention. In the views of FIGS. 6, 7, 8 and 9, the impurity type contained in the alloy foil members used to form the emitter, gate and emitter short is indicated.

Figure 6:
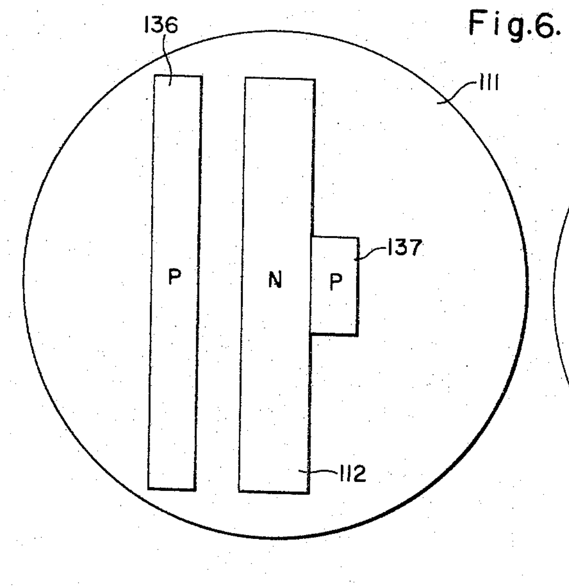
FIGS. 6, 7, 8 and 9 are plan views of alternative embodiments of the present invention.

In FIG. 6, the emitter 112 is a strip like member disposed approximately in the center of the top surface 111 of the device with an adjacent parallel strip-like gate contact 136. A small portion of the emitter junction remote from the gate contact 136 is shorted by member 137.

Figure 7:
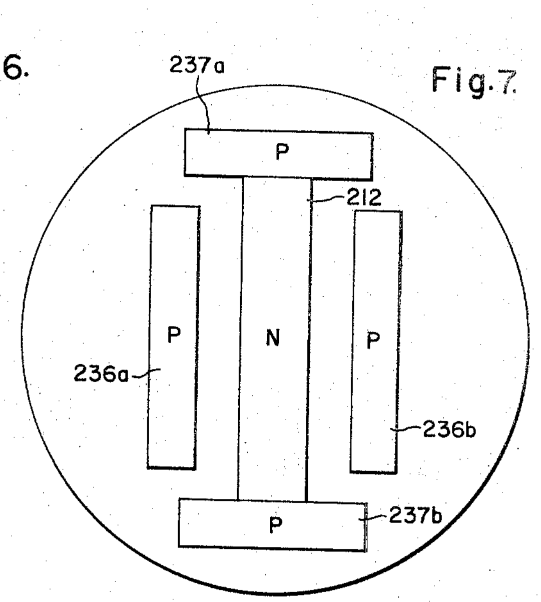

In FIG. 7, the configuration of FIG. 6 is modified in order to provide better gate control over a greater junction periphery by the provision of strip-like emitter 212 in the center of the device with parallel gate contacts **236*a* and 236*b* on opposite sides thereof which would be externally connected for operation. Shorting members 237*a* and 237*b* are provided at the ends of the emitter strip 212** to reduce the emitter injection in those areas.

Figure 8:
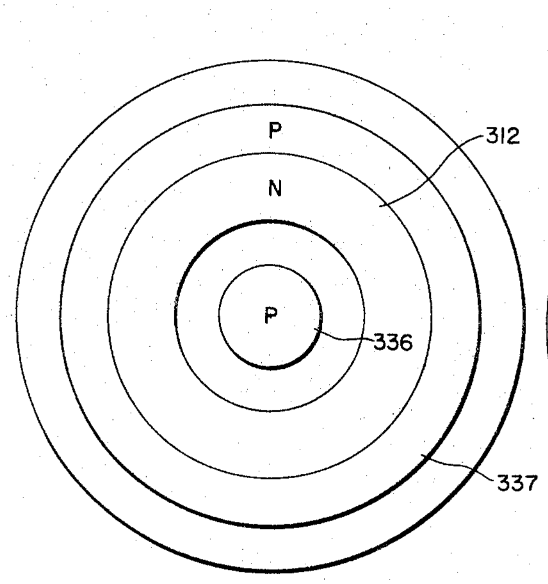

In FIG. 8, the emitter 312 is an annular member with the short being also provided by an annular member 337 surrounding the emitter. The gate contact 336 is a circular member disposed in the center of the device.

Figure 9:
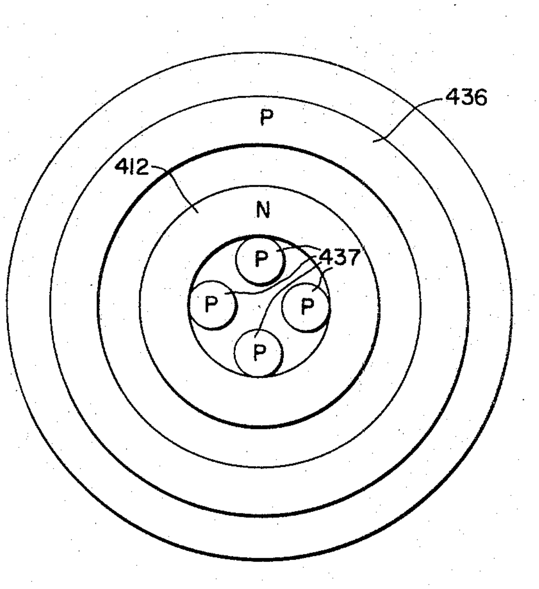

The configuration of FIG. 9 is similar to that of FIGS. 1 and 2 with an annular emitter 412 and annular gate contact 436. However, a plurality of shorting members 437 are provided in a symmetrical configuration within the inner periphery of the emitter 412. This configuration permits an emitter with large perimeter and improves the power handling capability of the device.

Devices in accordance with the present invention all restrict the current flow through the emitter to a ring (FIGS. 1, 8 and 9) or a line (FIGS. 6 and 7) so as to minimize excessive heating at a point which may result in thermal failure of the device.

While the present invention has been shown and described in a few forms only, it will be apparent that various changes and modifications may be made without departing from the spirit and scope thereof.

What is claimed is:

1. A semiconductor controlled rectifier comprising: four semiconductive regions arranged in succession of which contiguous regions are of opposite semiconductivity type with a P–N junction therebetween; said regions including a first emitter region, a first base region, a second base region and a second emitter region; means to short the P–N junction between said first emitter region and said first base region to reduce the injection efficiency of the P–N junction and permit a high turn-off gain; first means to make electrical contact to said first base region at a position remote from said means to short the P–N junction to permit a high turn-on gain; and second and third means to make electrical contact to said first emitter region and said second emitter region, respectively; said second base region being of semiconductive material having a substantially uniform impurity concentration;

said first base region and said second emitter region being of diffused semiconductive material having an impurity concentration decreasing in the direction toward said second base region; said first emitter region of recrystallized semiconductive material; said second means comprising a metal member fused in ohmic contact with said first emitter region; said means to short the P–N junction comprising a metal member fused in ohmic contact with said first base region and also fused together with said second means; and said first means and said third means comprising metal members fused in ohmic contact with said first base region and said second emitter region, respectively.

2. A semiconductor controlled rectifier in accordance with claim 1 wherein: at least one of said first base region and said second base region is greater than a carrier diffusion length in thickness.

3. A semiconductor controlled rectifier in accordance with claim 1 wherein said first emitter region has a lateral dimension of less than about four carrier diffusion lengths.

4. A semiconductor controlled rectifier exhibiting good turn-off characteristics comprising: four successive semiconductive regions of alternate semiconductivity type with a P–N junction between each pair of contiguous regions;

said regions including, in order, a first emitter region, a first base region, a second base region and a second emitter region; said first emitter region having an annular configuration on a surface of said first base region; an ohmic contact on said surface having an annular configuration surrounding and spaced from said first emitter region; a metallic member fused to the inner periphery of said first emitter member to short a portion of the P–N junction between said first emitter region and said first base region.

References Cited

UNITED STATES PATENTS

| | | | |
|---|---|---|---|
| 2,971,139 | 2/1961 | Noyce | 317—235 |
| 2,993,154 | 7/1961 | Goldey et al. | 317—235 |
| 3,090,873 | 5/1963 | Mackintosh | 307—88.5 |
| 3,123,750 | 3/1964 | Hutson et al. | 317—235 |
| 3,124,703 | 3/1964 | Sylvan | 307—88.5 |
| 3,131,311 | 4/1964 | Ross | 307—88.5 |
| 3,140,963 | 7/1964 | Svedberg | 148—33.5 |
| 3,213,339 | 10/1965 | Henkels | 317—235 |

JOHN W. HUCKERT, *Primary Examiner.*

R. SANDLER, *Examiner.*